(12) United States Patent
Marino et al.

(10) Patent No.: US 6,396,437 B1
(45) Date of Patent: May 28, 2002

(54) RADAR MULTIBEAM VELOCITY SENSOR

(75) Inventors: Louis S. Marino, Wayne, NJ (US); Robert W. Slater, Bardonia, NY (US)

(73) Assignee: BAE SYSTEMS Aerospace Inc., Wayne, NJ (US)

( * ) Notice: Subject to any disclaimer, the term of this patent is extended or adjusted under 35 U.S.C. 154(b) by 0 days.

(21) Appl. No.: 06/710,883

(22) Filed: Mar. 12, 1984

(51) Int. Cl.$^7$ ................................. G01S 13/58
(52) U.S. Cl. ........................ 342/117; 342/104
(58) Field of Search ................... 343/8, 9 R, 55 W, 343/387, 418; 342/104, 117

(56) References Cited

U.S. PATENT DOCUMENTS 4,106,017 A * 8/1978 Roeder et al. ............... 343/8
4,158,202 A * 6/1979 Hubka et al. ............ 343/55 W

* cited by examiner

*Primary Examiner*—Mark Hellner
(74) *Attorney, Agent, or Firm*—David L. Davis; Edward A. Onders

(57) ABSTRACT

A microstrip antenna radiates and receives six beams in sequence out of a common aperture and processes return signals with common electronics in order to measure the velocity components relating to a backscattering surface. Sequentially, the first four beams are processed by measuring Doppler shift in a return signal while the last two beams are processed for time correlation. The result of the present invention is a combined time correlation and Doppler measurement velocity sensor available for operation over virtually all terrains and the vehicle speed range.

10 Claims, 3 Drawing Sheets

RADAR MULTIBEAM VELOCITY SENSOR

FIELD OF THE INVENTION

The present invention relates to vehicle velocity sensors and more particularly to a multibeam radar velocity sensor that performs both Doppler shift and time-correlation measurements.

BACKGROUND OF THE INVENTION

Existing Doppler aircraft radar velocity sensors suffer from a loss of functional operation over smooth water. This occurs because the angles of incidence and reflection of the radiated signal are the same over smooth water and no significant amount of RF energy is backscattered toward a radar receiver.

In the past, this problem has been approached by increasing RF power to compensate for the signal return loss over smooth water. However, solid state RF transmitters are peak power limited resulting in insufficient signal return for tracking most smooth water surfaces.

Velocity measurement through time correlation is an approach which has been demonstrated to provide good functional operation over smooth water; but requires considerable additional complexity to operate beyond limited drift angles (to ±45 degrees) and below 5 knots speed. However, use of the time correlator to only augment a Doppler velocity sensor permits the combined sensor to operate over the entire flight profile without the additional complexity required for the time correlation sensor. The reason that these two sensor techniques are complementary is because smooth water operation where the time-correlator is required occurs at low wind speeds (hence small drift angles), and at speeds greater than 5 knots because lower speeds occur at low altitude where the vehicle downwash roughens the water permitting Doppler operation.

Therefore, the basis of this invention is to add a minimal complexity time-correlator to a Doppler velocity sensor resulting in functional operation over all terrains.

BRIEF DESCRIPTION OF THE PRESENT INVENTION

The present invention offers a velocity sensor which performs over virtually all types of land and water terrains. The proposed system radiates and receives six beams of microwave energy in sequence, out of a common aperture, and utilizes a common signal processor for implementing both time correlation and Doppler measurements in order to measure the velocity components relative to the backscattering surface. If, for example, we consider a system on board an aircraft or other vehicle operating with six beams, the first four beams may be processed by measuring the Doppler shift in a return signal received by the antenna. From these four non-coplanar transmitted beams, the vehicle velocity can be computed. The last two beams are sequentially processed by two receive antennas which are mounted on the vehicle and separated by a fixed distance. A signal processor performs time-correlation measurements and makes use of the speckled nature of the power backscatter from the ground to measure the time delay between the power received by the receiving antennas. This measured time delay and the knowledge of the displacement between the receiving antennas allows the velocity of the vehicle to be computed. The velocity computed by Doppler and time correlation measurements may be averaged or weighed to achieve accurate measurement over widely varying terrain.

For example, over most terrains and speeds, independent measurements of vehicle velocity are made from the Doppler shift measurements of the first four sequenced beams and the time correlation measurement of the last two beams. Over very smooth water, where the Doppler return signal of the transmitted beams 1–4 is sharply reduced due to the mirror-like nature of the water, the velocity measurement depends on the time-correlation measurement using the return signal from the last two beams which is increased in strength because it is directed perpendicularly to the backscattering surface.

The present invention lends itself to the construction of a single microstrip antenna capable of transmitting and receiving the multibeams for velocity measurements. Such a single antenna permits a combined time correlation and Doppler measurement to be made so that the present velocity sensor may operate over virtually all terrains and the entire vehicle speed range.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
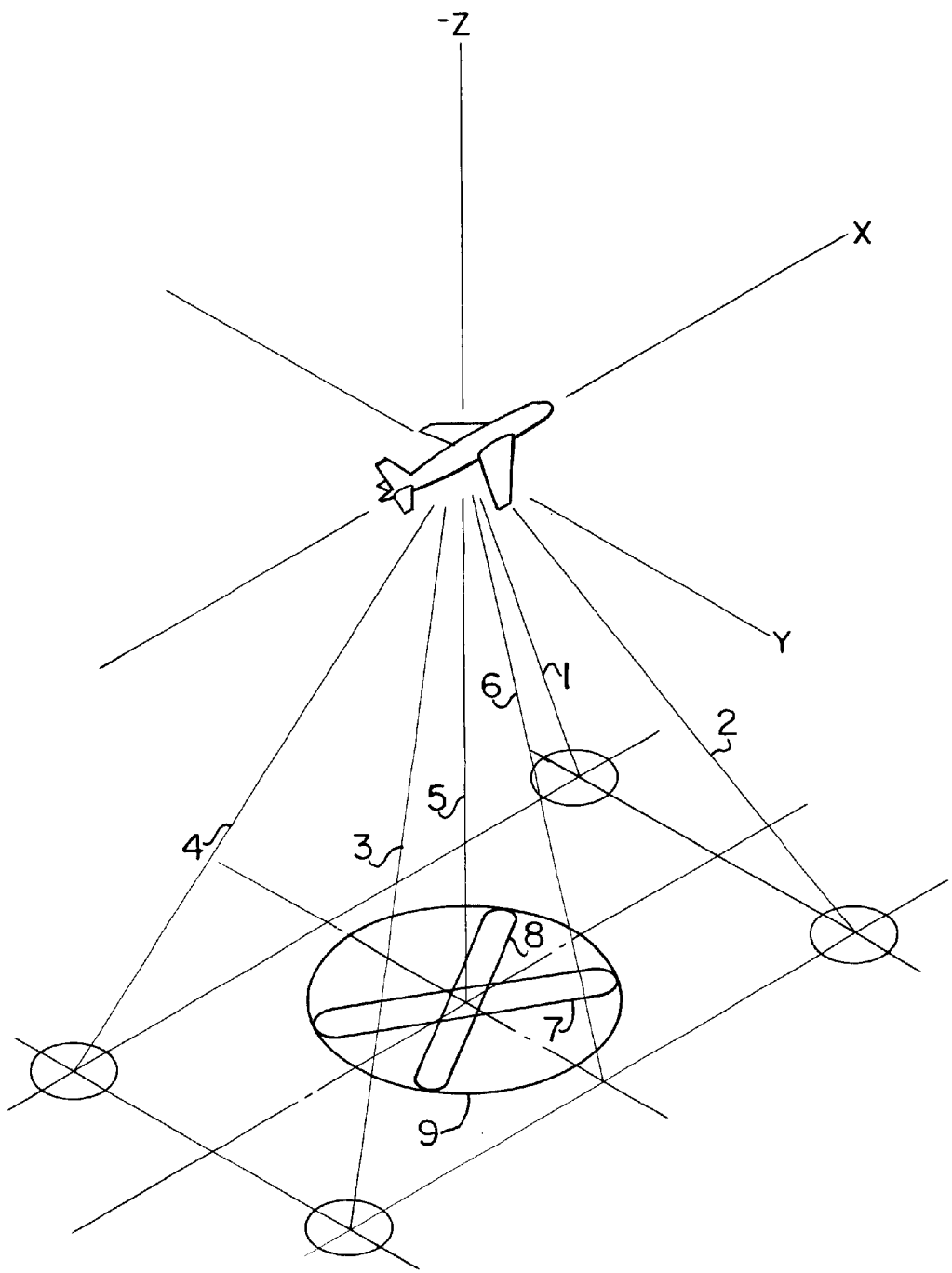
FIG. 1 is a schematic representation of an aircraft operating with the multibeam velocity center of the present invention.

FIG. 1 illustrates the concept of the present invention. A vehicle such as the illustrated aircraft is equipped with transmitting and receiving antennas which are capable of generating four symmetrically positioned beams 1–4. These beams are transmitted and received serially over four distinct time intervals so that a Doppler shift measurement may be made of return signals which are processed to determine velocity of the aircraft. Fifth and sixth time intervals are utilized to obtain time correlation measurements from separate beams. The transmit patterns during the fifth and sixth intervals are indicated by reference numbers 7 and 8 in FIG. 1 while the receive pattern of the two receiving antennas is by reference numeral 9. During normal cyclical operation of the present system, beams 1–4 are generated during consecutive intervals, followed by the generation of transmit beams 7 and 8 and simultaneous reception by two receive antennas with each having the footprint on the ground shown by numeral 9, during a final two intervals. Conventional Doppler shift radar measurements are made during the first four time intervals while time correlation measurements are made during the fifth and sixth intervals. For the reasons set forth hereinabove, the utilization of Doppler and time-correlation measurements enables the invention to be employed over virtually all terrains and vehicle speed ranges.

Figure 2:
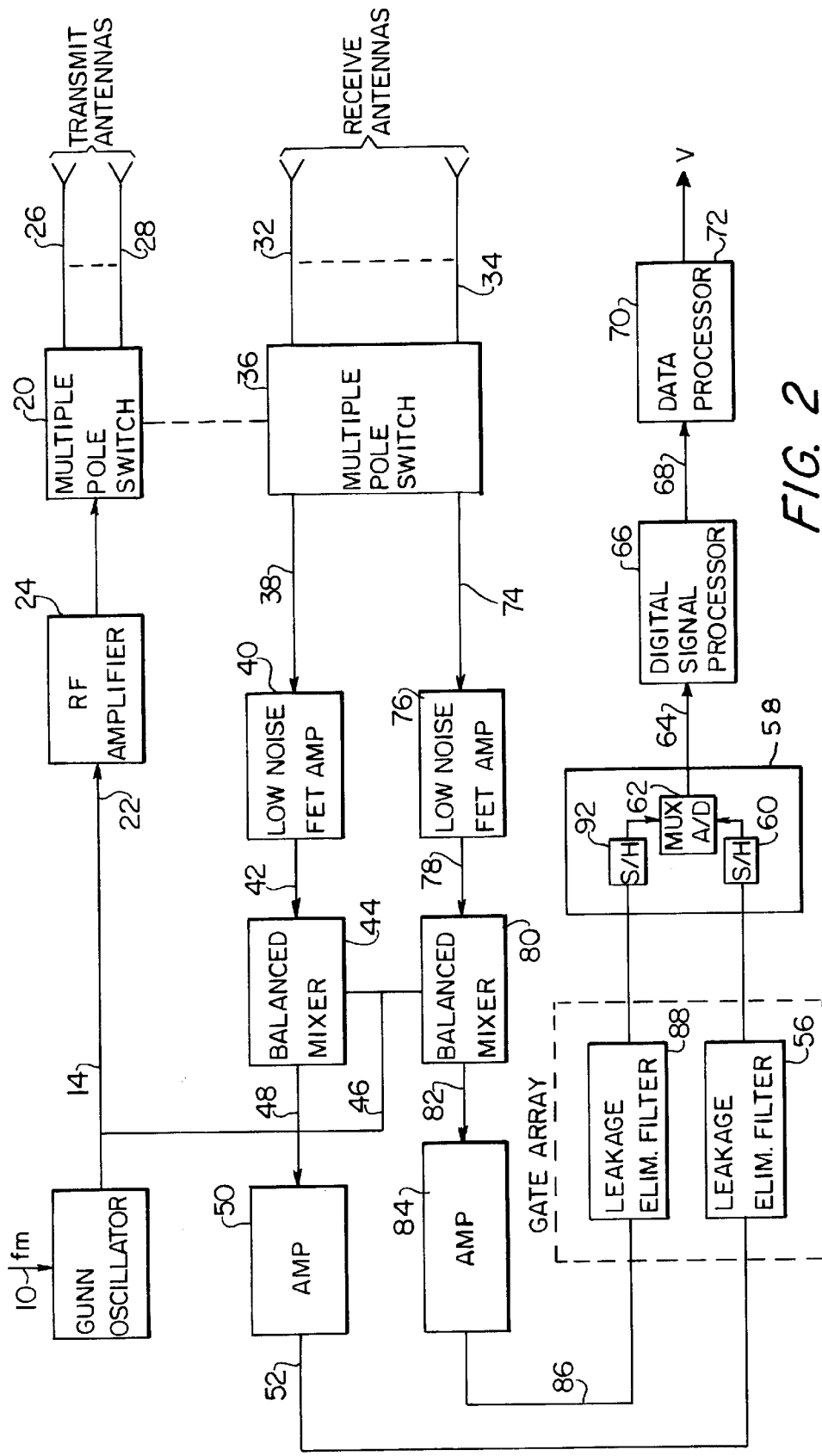
FIG. 2 is a detailed block diagram of the present invention.

FIG. 2 is a detailed block diagram of the present invention illustrating the system employed for transmitting and receiving both Doppler and time-correlation signals. As will be appreciated shortly, the system shares most components for both types of measurements.

Referring to FIG. 2 with greater particularity, a modulating frequency $f_m$ is introduced, along input line 10 to a Gunn oscillator 12. The output 14 from the oscillator is a frequency-modulated continuous-wave signal which is amplified by a solid-state RF power amplifier. Part of the oscillator signal is coupled off to be used as a local oscillator in the receiver. The amplified signal is input to a multiple pole switch 20 which serially switches between six states, corresponding to the six generated beams. In the typical case discussed herein where six beams are to be generated during six corresponding intervals, a corresponding number of transmit antennas are connected to the output of multiple pole switch 20. The six transmit antennas are collectively represented by reference numerals 26 and 28.

A similar number of receive antennas collectively indicated by 32 and 34 form the input of a multiple pole switch 36 which is ganged to multiple pole switch 20. During the first four time intervals, when Doppler measurements are made, the Doppler signals pass from the switch 36 to a low noise FET amplifier 40 via input line 38. The output line 42 of the amplifier 40 is input to a balanced mixer 44 which is provided at a second input with the output signal from the Gunn oscillator 12 via input line 46. The mixed signal occurring at output line 48 is input to an amplifier filter 50 which generates an amplified signal along output line 52, and selects the first sideband of the received signal and rejects the other sidebands. It will be noticed that a similar serial combination of FET amp, balanced mixer and amplifier is illustrated underneath those just discussed. These represent a second channel of signal processing which is employed only during the fifth and sixth time intervals when time correlation measurements are made. Returning to the first channel signal at output line 52, a leakage elimination filter 54 next receives the amplified signal, and eliminates the component of zero Doppler shift and to the leakage between the transmit and receive antennas. The result of the output from filter 54 is connected, via line 90, to an analog-to-digital circuit 58 which includes a sample-and-hold circuit 92 serially connected to the input of a multiplexer 62. The output line 64 from the multiplexer is connected to a digital signal processor 66, such as the commercially available unit known in the industry as the TMS 320. The purpose of the processor is to determine the frequency corresponding to the centroid of power of the Doppler-shifted received signal. The output from the processor is connected via line 68 to a data processor 70, for example the INTEL 8748. During the Doppler mode when the first four beams are being processed, the data processor performs such necessary customary functions as the application of scale factors, formatting of data and correction averages. The result of the Doppler measurements will be a signal, at output line 72, representing velocity of the aircraft, as shown in FIG. 1.

During the fifth and sixth time intervals when time-correlation measurements are made, the output from Gunn oscillator 12 is amplified, 24, and sequentially transmitted to form the antenna patterns on the ground shown as 7 and 8 in FIG. 1. During these intervals when time-correlation measurements are made, two receive antennas, whose antenna patterns are shown by 9 in FIG. 1 devoted to receiving the time-correlation signals, are physically spaced apart on the aircraft as will be explained hereinafter. The return from one of these antennas is delivered to the multiple pole switch 36 where it is processed by the FET amp 40, mixer 44 and amp 50, as was just discussed in connection with the Doppler signals. However, a second channel along the line of travel is employed to measure the return signal which is time delayed from the first antenna by a correlation time equal to the antenna generation divided by twice the vehicle speed. The return from that antenna is delivered, via multiple pole switch 36, to output line 74 which delivers the received signal to a second channel, comparable to the first and likewise includes an FET amplifier 76 connected to a balanced mixer 80 via connecting line 78. The mixer 80 also has a second input which is connected by line 46 to the output of Gunn oscillator 12. The mixed signal is connected along line 82 to amp 84, which generates an amplified second channel signal along line 86. Thus, during time correlation measurements, signals from two time-correlation antennas will respectively be present at output lines 52 and 86 in preparation of their parallel filtering by leakage eliminator filters 88 and 56. With the zero Doppler-shifted frequency being eliminated by the filters, the time correlation signals undergo conversion and multiplexing through the parallel connected sample-and-hold circuits 60 and 92. Analog-to-digital multiplexer 62 alternately multiplexes the signals from the connected sample-and-hold circuits and delivers them, via line 64, to the digital signal processor 66. In accordance with well-known radar measurements, the equation for solving computed velocity may be expressed as $$v = d/2\tau_m$$

where d is equal to the distance between the receive antennas for the time-correlation measurement and $\tau_m$ is the time displacement between the two signals received by their respective antennas. The digital signal processor 66 solves a cross-correlation function to determine $\tau_m$ in a conventional fashion. The signal appearing along line 68 is then connected to data processor 70 which computes the velocity from the variables of the equation as expressed above. Accordingly, as will be appreciated, the computed velocity at output line 72 will first be a value as determined by Doppler measurements during the first four time intervals of a cycle and will next represent a second number as determined from the time-correlation measurements during the fifth and sixth intervals of a cycle. Over most terrains and speed, independent measurements of vehicle velocity will be made from the Doppler shift measurements of beams 1–4 and the time-correlation measurements from beams 5 and 6. They will be used to cross check one another in a mathematical weighing scheme which does not form a part of the present application per se. Over very smooth water where the Doppler return signal of transmitted beams 1–4 is sharply reduced due to the mirror-like nature of the water, the velocity measurements depend upon the time-correlation measurements using the return signal from beams 5 and 6 will be relied upon because they are increased in strength over smooth water because the return is directed perpendicularly to the backscattering surface.

Figure 3:
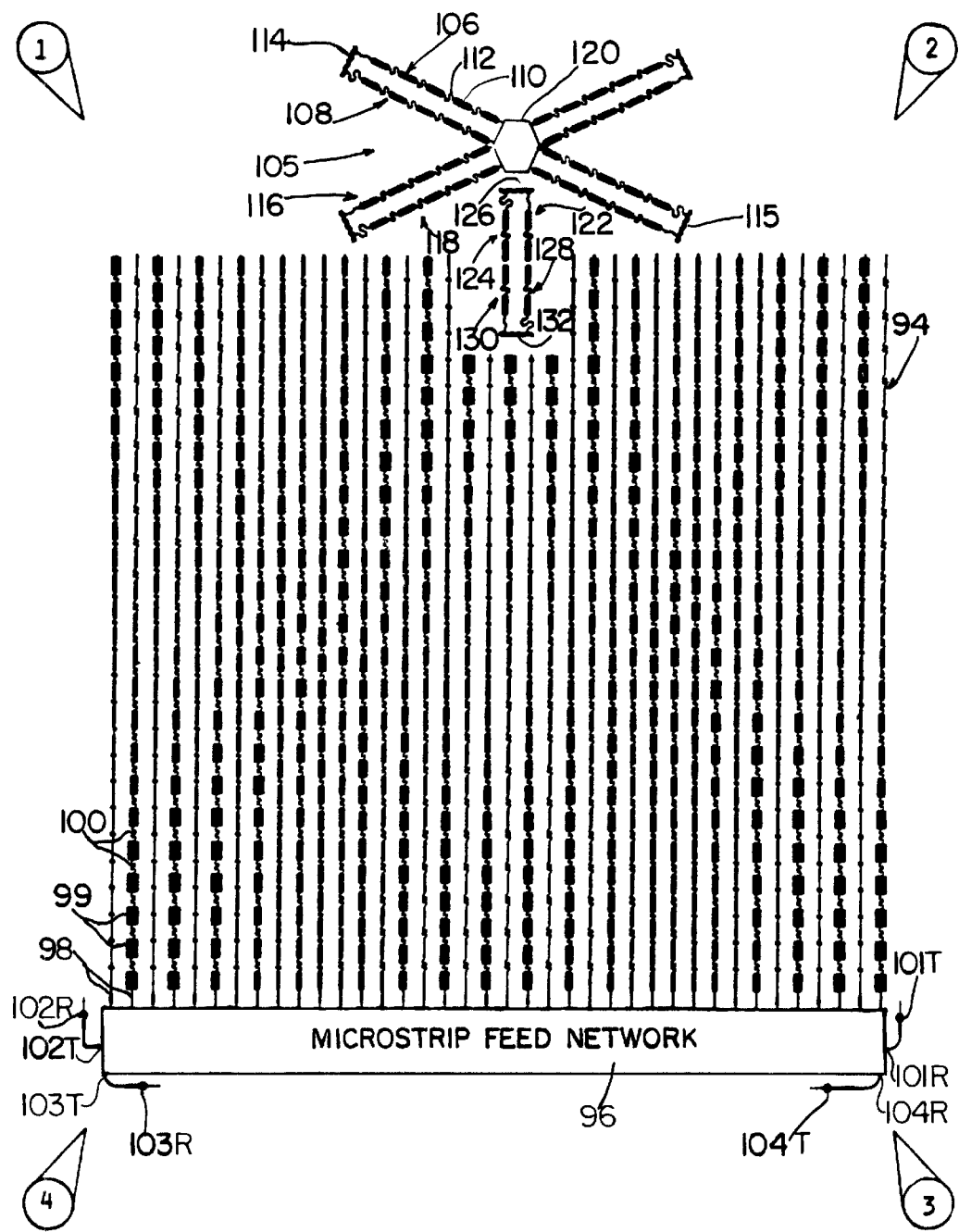
FIG. 3 illustrates the artwork for a microstrip antenna which operates in accordance with the present invention.

FIG. 3 illustrates a microstrip antenna configuration which may be used for transmitting and receiving during all six time intervals, permitting the single microstrip antenna to be used for Doppler shift and time correlation measurements.

Reference is now made to FIG. 3 which illustrates the artwork for a microstrip antenna as utilized in the present invention. The antenna has a central section of interleaved arrays generally indicated by reference numeral 94. A Doppler interleaved array is disclosed in copending U.S. patent application Ser. No. 650,491, filed Sep. 14, 1984, by the present assignee. These interleaved arrays are alternating arrays associated with the transmitting and receiving antennas utilized for Doppler shift measurement during the first four measurement intervals as discussed above. As in the typical case of microstrip antennas, a microstrip feed network 96 propagates energy down each array. Microstrip transformer sections such as 98 couple energy from the microstrip feed network to the radiating patches such as 99, themselves separated by phase links such as 100. Eight ports 101T, 101R, 102T, 102R, 103T, 103R and 104T and 104R energy into (transmit) and out of (received) the microstrip feed network 96. Beams 1–4 indicated in the corners of FIG. 3 are associated with the interleaved arrays 94 and are transmitted and received sequentially for completing the Doppler shift measurements as explained hereinbefore.

The criss-cross broadside microstrip antenna portion generally indicated by reference numeral 105 is employed for the time-correlation measurements. The configuration includes a number of microstrip antenna sections such as sections 106 and 108 connected at outward ends thereof by connecting links 114. Each of the sections 106 and 108 includes a plurality of serially connected radiating patches 110 interconnected by phase links 112.

Similar arrays 116 and 118 constitute a second transmitting antenna employed during time-correlation measurements. Hexagonal feed 120 is located at the center of the criss-crossing arrays and feeds transmitting energy to the microstrip antenna portion 105 so that a transmitted pattern such as 7 and 8 (FIG. 1) is generated.

The physically displaced receiving antennas utilized during time-correlation measurements are each seen to include dual microstrip arrays such as 122 and 124 interconnected at a first end by connecting link 126. Opposite ends of the arrays are not connected and are in spaced relation to the two parallel microstrip arrays 128 and 130 of the second time correlation receiving antenna, the arrays being connected by connecting link 132. Since these two unconnected and physically separated receiving antennas are mounted in close proximity to one another, they will receive virtually the same return signal at an interval apart ($\tau_m$) thereby enabling an accurate time correlation to be computed as previously explained. The microstrip antenna of FIG. 3 assumes a single aperture in a vehicle and offers superior performance in a space combining the transmit and receive antennas for Doppler shift and time-correlation measurements. It should be understood that the antenna configuration of FIG. 3 is a preferred implementation for the present invention but is by no means a limiting one.

Although Doppler shift measurement and time-correlation measurement have in themselves been successfully used in the prior art for velocity computation, the present invention offers a novel approach and system in combining the two by incorporating common circuitry switching between Doppler shift measurement and time-correlation measurement. Accordingly, the present invention offers a velocity sensor for operation over virtually all terrains and the entire vehicle speed range.

Although the discussion above indicates a multibeam system employing six beams, it is to be understood that this number is by way of example only and the system is not so limited.

It should be understood that the invention is not limited to the exact details of construction shown and described herein for obvious modifications will occur to persons skilled in the art.

We claim:

1. A multibeam radar velocity sensor mounted to a vehicle and comprising:

means for generating a radar signal;

a first plurality of transmitting antennas associated with a Doppler shift measurement;

a second plurality of transmitting antennas associated with a time-correlation measurement;

a first multiple pole switch connected between the generating means and the first and second antennas for sequentially transmitting a plurality of radar beams in predetermined patterns;

a first plurality of receiving antennas corresponding in number to those of the first transmitting antennas;

a second plurality of receiving antennas corresponding in number to those of the second transmitting antennas;

first means for mixing the signals sequentially received by the first plurality of receiving antennas with a signal from the generating means;

a second multiple pole switch ganged to the first switch for sequentially switching the signals from the first plurality of receiving antennas to the first mixing means;

processing means connected to the output of the mixing means for computing the Doppler shift between the mixed sequentially received signals and calculating velocity therefrom;

second means for mixing the signals sequentially received by the second plurality of receiving antennas with a signal from the generating means;

the second multiple pole switch also switching the signals from the second plurality of receiving antennas to an input of the second mixing means;

the processing means also connected to the output of the second mixing means for performing a time-correlation computation on the signals sequentially received from the second receiving antennas and calculating velocity therefrom, independent from the velocity calculation from the Doppler shift measurement.

2. The system set forth in claim 1 together with a leakage elimination filter serially connected to the output of each mixing means for eliminating a zero Doppler-shifted signal.

3. The system set forth in claim 1 wherein the processing means comprises a digital signal processor for measuring the Doppler shift of the signals received from the first receiving antennas and for solving a cross-correlation function for the signals received from both the first and second receiving antennas.

4. The system set forth in claim 1 wherein the processing means comprises a data processor for formatting data, applying scale factors, and averaging data from the Doppler signals received by the first receiving antennas and for calculating velocity from measured time-correlation variables determined from signals received by the second receiving antennas.

5. The system set forth in claim 2 wherein the processing means comprises:

(a) a digital signal processor for measuring the Doppler shift of the signals received from the first receiving antennas and for solving a cross-correlation time function for the signals received from the first and second receiving antennas; and (b) a data processor for formatting data, applying scale factors, and averaging data from the Doppler signals received by the first receiving antennas and for computing velocity from measured time-correlation variables determined from signals received by the first and second receiving antennas.

6. The system set forth in claim 5 together with sample-and-hold circuits connected between each of the mixing means and an input of the signal processor for storing each mixed signal until signal processing thereon is completed.

7. The system set forth in claim 6 together with multiplexing means connected between respective output terminals of the sample-and-hold circuits and the input of the signal processor for multiplexing between the first plurality and second plurality of sequentially mixed received signals.

8. The system set forth in claim 7 wherein the first and second plurality of receiving antennas are fabricated as a microstrip antenna.

9. The system set forth in claim 7 wherein the first and second plurality of transmitting antennas are fabricated as a microstrip antenna.

10. The system set forth in claim 7 wherein the first and second pluralities of transmitting and receiving antennas are fabricated as a microstrip antenna occupying a single aperture.

\* \* \* \* \*